Dec. 16, 1924.  1,519,309
H. H. HUMMEL
VARIABLE SPEED DRIVING MECHANISM
Filed Aug. 24, 1922   2 Sheets-Sheet 1

Inventor
H. H. Hummel,
By Watson, Coit, Morse & Grindle,
Attorneys.

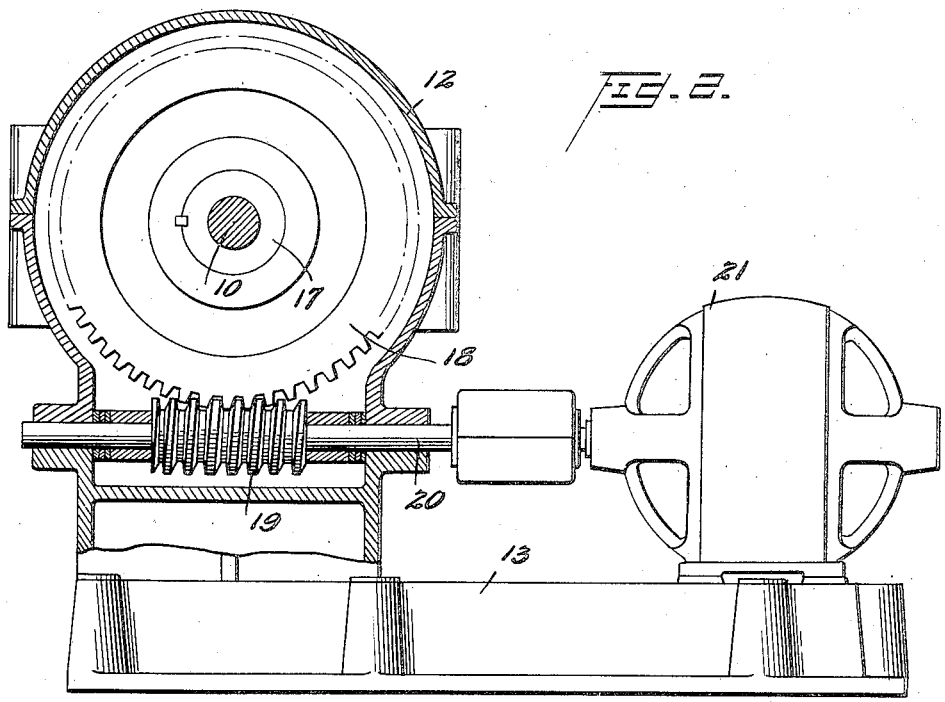
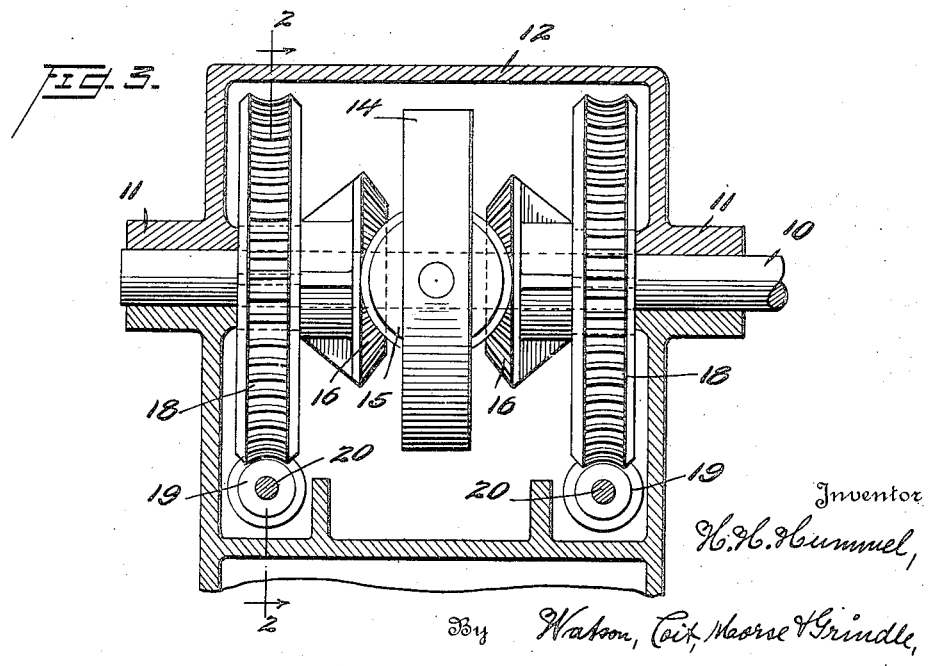

Patented Dec. 16, 1924.

1,519,309

UNITED STATES PATENT OFFICE.

HOWARD H. HUMMEL, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

VARIABLE-SPEED DRIVING MECHANISM.

Application filed August 24, 1922. Serial No. 584,068.

*To all whom it may concern:*

Be it known that I, HOWARD H. HUMMEL, a citizen of the United States, and residing at Bethlehem, Lehigh County, State of Pennsylvania, have invented certain new and useful Improvements in Variable-Speed Driving Mechanisms, of which the following is a specification.

The present invention relates to variable speed driving mechanisms and particularly to mechanisms of the type employing two variable speed electric motors connected through differential gearing to the shaft to be driven. By varying the relative speeds of the two motors, any desired speed may be imparted to the driven shaft, from zero to the maximum obtainable.

The object of the invention is to provide mechanism of this character in which the connection between each of the driving motors and the driven shaft includes means for locking the driven shaft against rotation except when the motors are energized. In performing certain classes of work by means of prior devices of this kind, for instance in rotating a hoisting drum, a considerable force is exerted continually by the load in such direction and of such magnitude that the motors will be run backward if by chance the supply of electricity should be interrupted. In the case of a hoisting drum the failure of the current supply might result in serious consequences, the load being allowed to fall unless the drum or other apparatus is provided with automatic braking devices. In other types of apparatus the effect of the current failure might be equally disastrous. My invention contemplates utilization of a connection between each motor and the driven shaft which includes a worm and worm wheel of such type that the motors are at all times locked against movement due to any force imparted to the driven shaft by the work. Preferably I rigidly connect to each gear of the differential a worm wheel and to each motor shaft a worm meshing with the corresponding worm wheel. In the accompanying drawings a construction of this type is illustrated by way of example and is described in detail in the following description.

In the drawings:

Fig. 2 is a section on line 2—2 of Figure 3; and

Fig. 3 is a section on line 3—3 of Figure 1.

Figure 1:
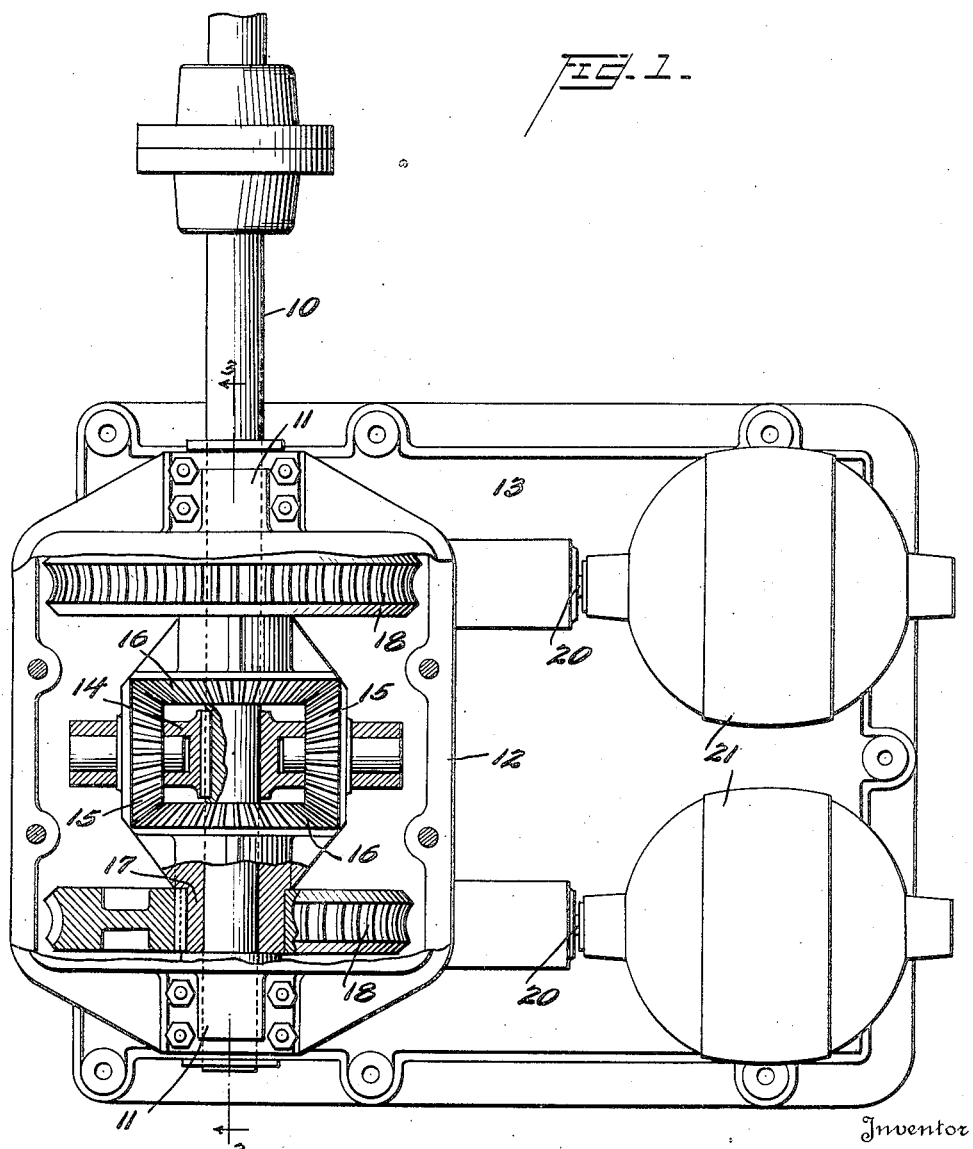
Fig. 1 is a plan view, partly broken away, of the variable speed driving mechanism.

The driven shaft is indicated at 10 and extends through and is rotatably supported in suitable bearings 11 in a gear casing rigidly mounted on a base 13. Keyed to the shaft 10 is a spider 14 having differential pinions 15 rotatably mounted thereon. Pinions 15 mesh with differential gears 16 and each of these gears is integral with a sleeve 17 rotatably mounted on the driven shaft. Each sleeve 17 has keyed thereto a worm wheel 18 which meshes with a worm 19 fastened on the motor shaft 20. The two motor shafts 20 are parallel and extend into the casing 12 through suitable apertures which constitute bearings, the outer ends of the shafts being driven by the armatures of motors 21, which are also secured to base 13.

The work which the shaft 10 may accomplish may be varied in character and may consist either in rotating a hoisting drum, driving a cold saw, or other such service. In operation either one or both of the motors may be utilized. These motors may be reversible if desired, and are adapted to be driven at different speeds. It will be obvious that by varying the speed of one motor and holding the speed of the other constant, different speeds may be obtained for the driven shaft 10 and in that both motors may be adjusted in this manner, any desired speed of the driven shaft may be obtained within the maximum capacity of the motors.

Inasmuch as the differential gears are driven from the motors through worm gearing it will be impossible, in case the supply of current to the motors should be interrupted, for any force exerted by the work on the driven shaft 10 to cause rotation of this shaft inasmuch as the worm wheels 18 are frictionally locked by the worms with which they engage. The advantages of this construction will be realized by those skilled in the art, and also the possibility of altering the design and arrangement of the component parts of the invention without departing from its spirit.

Having thus described the invention what is claimed as new and desired to be secured by Letters Patent is:

A unitary variable-speed power device comprising a base member, a gear case carried by the base member, aligned bearings carried by the gear case, a shaft extending through the bearings, a spider carried by the shaft intermediate the bearings, a plurality of pinions carried by the spider, gears loosely mounted on the shaft and engaging opposite sides of the pinions, worm wheels connected to the gears, a pair of opposed bearings in the gear case in the central plane of each worm wheel, shafts in the bearings, worms carried by the shafts and meshing with the worm wheels, and motors carried by the base member and each having its driving shaft aligned with and connected to one of the last-named shafts, said worm wheels and worms having such a pitch as to constitute irreversible drives.

In testimony whereof I hereunto affix my signature.

HOWARD H. HUMMEL.